(12) United States Patent
Ozaki et al.

(10) Patent No.: US 7,442,470 B2
(45) Date of Patent: Oct. 28, 2008

(54) HIGH POWER OUTPUT NON-AQUEOUS ELECTROLYTE SECONDARY BATTERY

(75) Inventors: Yoshiyuki Ozaki, Wakayama (JP); Kazuhiro Ota, Sanda (JP); Hiroyuki Fujimoto, Sakurai (JP); Koichi Morita, Nara (JP)

(73) Assignees: Matsushita Electric Industrial Co., Ltd., Osaka (JP); Osaka Gas Chemicals Co., Ltd., Osaka (JP)

( * ) Notice: Subject to any disclaimer, the term of this patent is extended or adjusted under 35 U.S.C. 154(b) by 299 days.

(21) Appl. No.: 11/242,959

(22) Filed: Oct. 5, 2005

(65) Prior Publication Data

US 2006/0078796 A1    Apr. 13, 2006

(30) Foreign Application Priority Data

Oct. 12, 2004   (JP) .............................. 2004-297467

(51) Int. Cl.
    *H01M 4/58* (2006.01)
(52) U.S. Cl. ................. 429/231.8; 429/231.95
(58) Field of Classification Search .............. 429/231.8, 429/231.95
    See application file for complete search history.

(56) References Cited

U.S. PATENT DOCUMENTS

| | | | |
|---|---|---|---|
| 5,340,670 | A | 8/1994 | Takami et al. |
| 2001/0051300 | A1 | 12/2001 | Moriguchi et al. |
| 2004/0219431 | A1* | 11/2004 | Ozaki et al. .............. 429/231.4 |
| 2006/0134523 | A1 | 6/2006 | Moriguchi et al. |

FOREIGN PATENT DOCUMENTS

| | | |
|---|---|---|
| JP | 06-275321 | 9/1994 |
| JP | 8-96794 | 4/1996 |
| JP | 2000-200624 | 7/2000 |
| JP | 2000-260479 | 9/2000 |
| JP | 2000-260480 | 9/2000 |
| JP | 2004-220926 | 8/2004 |
| KR | 0134638 | 5/1998 |
| KR | 1999-0083322 | 11/1999 |

OTHER PUBLICATIONS

Korean Office Action issued in corresponding Korean Patent Application No. KR 10-2005-0095246, dated May 26, 2007.
Korean Office Action dated Oct. 26, 2006.

* cited by examiner

*Primary Examiner*—Patrick Ryan
*Assistant Examiner*—Thomas H. Parsons
(74) *Attorney, Agent, or Firm*—McDermott Will & Emery LLP (57) ABSTRACT

In a high power output non-aqueous electrolyte secondary battery including a negative electrode including a graphitizable carbon material, the physical properties of the graphitizable carbon material is controlled. In a X-ray diffraction pattern of the graphitizable carbon material, a ratio of a peak intensity I(101) attributed to a (101) plane to a peak intensity I(100) attributed to a (100) plane satisfies $0 < I(101)/I(100) < 1.0$. A ratio of a peak intensity I(110) attributed to a (110) plane to a peak intensity I(004) attributed to a (004) plane satisfies $0.7 \leq I(110)/I(004) \leq 1.4$. The graphitizable carbon material preferably has a specific surface area measured by BET method of 1 to 5 $m^2/g$.

3 Claims, 4 Drawing Sheets

HIGH POWER OUTPUT NON-AQUEOUS ELECTROLYTE SECONDARY BATTERY

FIELD OF THE INVENTION

The present invention relates to a high power output non-aqueous electrolyte secondary battery, particularly to an improvement of a negative electrode of a high power output lithium ion secondary battery.

BACKGROUND OF THE INVENTION

Non-aqueous electrolyte secondary batteries have a high operating voltage and high energy density. In recent years, non-aqueous electrolyte secondary batteries have been commercialized as power sources for driving portable electronic equipment such as cell phones, notebook computers and video camcorders, and the demand thereof is rapidly growing. Particularly, production of lithium ion secondary batteries is steadily increasing, dominating the field of small secondary batteries.

In order to achieve a voltage as high as 4 V, a lithium ion secondary battery usually employs a lithium-containing composite oxide as a positive electrode active material. Typically used are $LiCoO_2$ and $LiNiO_2$ having a hexagonal crystal structure, and $LiMn_2O_4$ having a spinel structure. Among them, dominant are $LiCoO_2$ and improved types of $LiCoO_2$ because they can offer a high operating voltage and high energy density.

The lithium ion secondary battery usually employs, as a negative electrode material, a carbon material capable of absorbing and desorbing lithium ions. In order to achieve a flat discharge potential and high capacity density, graphite materials are dominantly used.

Only recently has the movement begun to utilize non-aqueous electrolyte secondary batteries in higher capacity battery applications including electric power storage systems and electric vehicles, in addition to in small consumer applications. In the field of hybrid electric vehicles (HEVs), vehicles equipped with nickel-metal hydride storage batteries have already been manufactured on a mass production basis and commercially available. In the wake of this stream, the development of vehicles equipped with, instead of nickel-metal hydride storage batteries, non-aqueous electrolyte secondary batteries has also progressed rapidly.

In the future, the widespread use of fuel cell vehicles is expected. Non-aqueous electrolyte secondary batteries are now viewed as a promising candidate as a secondary battery for assisting a fuel cell that is capable of offering long life and high input/output power performance.

The levels of performance required for non-aqueous electrolyte secondary batteries for HEV and fuel cell vehicle applications differ greatly from those for small consumer applications. Because the batteries for HEV and fuel cell vehicle applications need to instantly provide power assistance to an engine or to contribute the regeneration with a limited capacity, they are required to have higher input/output power performance. For this reason, a higher priority is placed on the achievement of higher input/output power performance, rather than the achievement of higher energy density. Further, for achieving higher input/output power performance, it is necessary to minimize the internal resistance of a battery. Under the circumstances, in order to achieve a significant improvement in input/output power performance, attempts have been made not only to develop or select suitable active materials or electrolytes, but also to improve the current collecting structure of electrodes, to reduce resistances of battery constituting components and to make electrodes longer and thinner so as to increase the reaction area of electrodes.

Non-aqueous electrolyte secondary batteries of high input/output power performance are also expected to serve as a power source for high power applications such as a power source for driving power tools, as well as to outperform existing nickel-cadmium storage batteries and nickel-metal hydride storage batteries.

In the designing process of a non-aqueous electrolyte secondary battery of high input/output power performance, as described above, important factors are the improvement of the current collecting structure and the reduction of resistances of battery constituting components. The improvement or selection of electrode active materials is also an important factor. Particularly in a low temperature environment, the latter factor largely affects the input/output power characteristics. Especially, the capability of carbon material in the negative electrode to absorb and desorb lithium ions is of significant importance. The improvement of this capability greatly contributes to the achievement of a battery of high input/output power performance.

As described earlier, the combination of the positive electrode and the negative electrode commonly employed in small consumer applications is not an optimal combination for yielding a high power output non-aqueous electrolyte secondary battery. In short, the combination of a positive electrode including $LiCoO_2$ as an active material and a negative electrode including graphite is not optimal.

Under the circumstances, the combination of a positive electrode including a lithium-containing composite oxide other than $LiCoO_2$ and a negative electrode including a low crystalline carbon material is considered as promising. As the low crystalline carbon material, the use of, for example, a non-graphitizable carbon material (hard carbon) is being examined.

Non-aqueous electrolyte secondary batteries of high input/output power performance are rarely charged from a discharged state to a fully charged state with a single charge. It is also rare that they are continuously discharged from a fully charged state. Usually, pulse charge/discharge cycles are repeated every specified seconds around a state-of-charge (SOC) of 50 to 60%. Accordingly, unlike batteries for small consumer applications, non-aqueous electrolyte secondary batteries of high input/output power performance are required to achieve a long cycle life when repeatedly charged and discharged with a pulse current. Also, non-aqueous electrolyte secondary batteries of high input/output power performance are required to have a capability to repeatedly charge and discharge regardless of the magnitude of pulse currents.

Hitherto, various proposals have been made for negative electrode materials of non-aqueous electrolyte secondary batteries. Examples thereof include a graphite material which is dominantly used for small consumer applications (Japanese Laid-Open Patent Publication No. 2000-260479), a low crystalline non-graphitizable carbon material (Japanese Laid-Open Patent Publication No. 2000-200624) and a pseudo graphite material having a controlled graphitization degree (Japanese Laid-Open Patent Publication No. 2000-260480). Carbon materials having specific physical properties specified using diffraction patterns obtained by wide-angle X-ray diffraction are also proposed. More specifically, Japanese Laid-Open Patent Publication No. Hei 6-275321 proposes a material having an intensity ratio $I(101)/I(100)$ of a peak intensity $I(101)$ attributed to a (101) plane to a peak intensity $I(100)$ attributed to a (100) plane that satisfies $0.7 \leq I(101)/I$ (100)≦2.2. The publication particularly recommends a carbon material having an intensity ratio I(101)/I(100) of not less than 0.8 or not less than 1.0.

However, when an electrode including a conventional carbon material is charged and discharged with a pulse current (i.e., when pulse charge/discharge is performed) for a long period of time as described above, its capability to charge and discharge decreases, which induces capacity degradation as well as the increase of internal resistance. Such a battery is not suitable for long-term use and not practical at all because, when used in an HEV, for example, it cannot provide sufficient power assistance or cannot sufficiently contribute to the regeneration.

A graphite material of Japanese Laid-Open Patent Publication No. 2000-260479, for example, has a layered structure in which hexagonal crystals are regularly arranged in the c-axis direction. During charge, lithium ions are intercalated between the layers to widen a spacing between the layers, and the graphite material expands. The stress accompanied by such expansion gradually increases during the repetition of pulse charge/discharge at a large current. Thereby, the charge acceptability of the graphite material gradually decreases, resulting in a short cycle life. In other words, the graphite material is not suitable as a negative electrode material for a battery to be subjected to repeated pulse charge/discharge.

Moreover, graphite powders, although it depends on the particle shape or the like, tend to be oriented in the c-axis direction. Accordingly, the site where lithium ions are selectively absorbed and desorbed is limited, and thus they are not suitable for a large current charge.

As for a non-graphitizable carbon material of Japanese Laid-Open Patent Publication No. 2000-200624, its charge/discharge reaction mechanism differs from the reaction mechanism of the graphite material, which means the intercalation of lithium ions between layers hardly occurs. Because most lithium ions are intercalated into the pores of the carbon material, the stress caused by expansion or contraction during charge/discharge is small. Further, because the non-graphitizable carbon material has a low degree of orientation, the sites where lithium ions are absorbed and desorbed are randomly arranged therein. For this reason, it can be said that the non-graphitizable carbon material is suitable for a large current charge. The non-graphitizable carbon material, however, has lower electroconductivity than graphite materials. As such, the internal resistance increases during discharge in which lithium ions leave. This tendency becomes remarkable particularly when a large current discharge is repeated.

A pseudo graphite of Japanese Laid-Open Patent Publication No. 2000-260480 has a crystallite thickness Lc in the c-axis direction of not less than 60 nm and less than 100 nm. In other words, it is a carbon material having a relatively high degree of graphitization. Accordingly, similar to the case of graphite materials, the use of pseudo graphite is likely to decrease charge acceptability.

Further, a battery proposed by Japanese Laid-Open Patent Publication No. Hei 6-275321 has a negative electrode plate with a thickness of 180 μm and a positive electrode plate with a thickness of 270 μm. Such a battery having thick electrode plates is not designed to offer high input/output power performance.

Carbon materials having an intensity ratio I(101)/I(100) of not less than 0.8 or not less than 1.0 are usually classified as a graphite material having a developed layered structure formed of hexagonal crystals. In such carbon materials, layers are slightly displaced or twisted as compared to natural graphite having a structure similar to monocrystal. Accordingly, almost similar to the case of the graphite material, the use of such carbon material is likely to decrease charge acceptability owing to its high crystallinity.

As discussed above, it is difficult for a non-aqueous electrolyte secondary battery including a conventional carbon material in the negative electrode to achieve a long cycle life when subjected to repeated charge/discharge cycles at a pulse current. Particularly in a low temperature environment, it is difficult to achieve high input/output power performance during pulse charge or pulse discharge at a large current.

SUMMARY OF THE INVENTION

The present invention relates to a high power output non-aqueous electrolyte secondary battery. The non-aqueous electrolyte secondary battery of the present invention comprises a positive electrode including a lithium-containing composite oxide, a negative electrode including a carbon material capable of absorbing and desorbing lithium ions, and a non-aqueous electrolyte.

The carbon material comprises a graphitizable carbon material (soft carbon). The graphitizable carbon material, which is a carbon material under graphitization process, partially has a regular hexagonal crystal arrangement. Information regarding crystallinity can be obtained from a diffraction pattern of the carbon material measured by wide-angle X-ray diffractometry.

A diffraction pattern of the graphitizable carbon material used in the present invention has a peak attributed to a (101) plane and a peak attributed to a (100) plane. A ratio of a peak intensity $I(101)$ attributed to a (101) plane and a peak intensity $I(100)$ attributed to a (100) plane satisfies $0 < I(101)/I(100) < 1.0$.

Herein, a peak intensity is determined based on the peak height.

The diffraction pattern of the graphitizable carbon material used in the present invention has a peak attributed to a (110) plane and a peak attributed to a (004) plane. A ratio of a peak intensity $I(110)$ attributed to a (110) plane to a peak intensity $I(004)$ attributed to a (004) plane satisfies $0.7 \leq I(110)/I(004) \leq 1.4$.

The graphitizable carbon material as described above hardly degrades even if it is subjected to repeated charge/discharge cycles at a pulse current. The graphitizable carbon material rapidly absorbs lithium ions during charge and rapidly desorbs lithium ions during discharge.

From the viewpoint of achieving a good balance of long cycle life and high input/output characteristics, the graphitizable carbon material used in the present invention preferably has a specific surface area measured by BET method of not less than 1 $m^2/g$ and not greater than 5 $m^2/g$.

From the viewpoint of producing a non-aqueous electrolyte secondary battery having a superior balance of reversible capacity and irreversible capacity, the negative electrode in a fully charged state preferably has a capacity density of not less than 170 Ah/kg and not greater than 250 Ah/kg.

The present invention can provide a non-aqueous electrolyte secondary battery in which capacity degradation and an increase in internal resistance hardly occur even when it is subjected to repeated pulse charge/discharge cycles for a long period of time. The present invention can further provide a non-aqueous electrolyte secondary battery capable of offering high power input/output during pulse charge or pulse discharge at a large current even at a low temperature environment.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The high power output non-aqueous electrolyte secondary battery of the present invention comprises a positive electrode including a lithium-containing composite oxide and a negative electrode including a carbon material capable of absorbing and desorbing lithium ions, and a non-aqueous electrolyte.

The positive electrode comprises a positive electrode core material and a positive electrode material mixture layer carried on each surface of the positive electrode core material. The negative electrode comprises a negative electrode core material and a negative electrode material mixture layer carried on each surface of the negative electrode core material. The positive electrode core material, the negative electrode core material and the non-aqueous electrolyte are not specifically limited, and any known materials therefor can be used.

The positive electrode material mixture layer typically includes a positive electrode active material comprising a lithium-containing composite oxide, a conductive material and a binder. The negative electrode material mixture layer typically includes a carbon material capable of absorbing and desorbing lithium ions, a binder, and optionally other carbon material as a conductive material. The conductive material and the binder are not specifically limited and any known ones can be used.

In order to achieve high input/output power performance, reduction of internal resistance is important. In order to reduce internal resistance, it is preferred to increase an electrode reaction area as large as possible. It is also preferred to reduce a distance between electrode core material and the surface of electrode material mixture layer as short as possible, in other words, to reduce the thickness of electrode material mixture layer.

In connection therewith, the use of a certain graphitizable carbon material in the negative electrode material mixture layer reduces reaction resistance fraction of internal resistance. As a result, a battery of high input/output power performance can be achieved that satisfies good cycle life characteristics during pulse charge/discharge at a large current.

Preferably, the total thickness of two positive electrode material mixture layers each carried on each surface of the positive electrode core material is about 40 μm to about 80 μm. Likewise, the total thickness of two negative electrode material mixture layers each carried on each surface of the negative electrode core material is preferably about 60 μm to about 100 μm.

When the total thickness of the positive electrode material mixture layers is less than 40 μm, although the current density per electrode area will be small, the amount of active material carried per electrode area will also be small, which means the current density per active material weight will be large. Conversely, when the total thickness of the positive electrode material mixture layers is greater than 80 μm, the internal resistance of the battery tends to be large. A particularly preferred total thickness of the positive electrode material mixture layers is not less than 40 μm and not greater than 70 μm.

The total thickness of the negative electrode material mixture layers is preferably adjusted according to the thickness of the positive electrode material mixture layers within the range of not less than 60 μm and not greater than 100 μm.

A positive electrode usually has an electrode area of not less than 500 cm$^2$ per battery capacity of 1 Ah. Accordingly, the resulting positive electrode will be very long and thin. Note that the "electrode area" used herein means an area of a surface of one positive electrode material mixture layer carried on one side of the positive electrode core material, and that the "area" used herein means an area obtained on the assumption that the surface of the positive electrode material mixture layers is completely flat. The "area" is not used in the strict sense. In the case of a battery composed of a plurality of positive electrode plates and a plurality of negative electrode plates, such as a laminate type battery, the electrode area can be calculated by multiplying an area of a surface of one positive electrode material mixture layer by the number of positive electrode plates. There is a relationship expressed by the following equation:

Electrode area of positive electrode per battery capacity of 1 Ah=Area in one surface (one side) of positive electrode core material where positive electrode material mixture layer is carried÷Battery capacity (nominal capacity).

In the positive and negative electrodes, the electrode area per battery capacity of 1 Ah is varied according to the thickness of the electrode material mixture layer.

The positive electrode active material is not specifically limited, and any known lithium-containing composite oxide can be used. Examples thereof include $LiCoO_2$, $LiNiO_2$ and $LiMn_2O_4$ having a spinel structure.

A transition metal contained in the composite oxide may be partially replaced with other element so as to improve cycle life characteristics. For example, the use of a lithium nickel composite oxide ($LiNiO_2$) in which Ni is partially replaced with Co or other element such as Al, Mn or Ti achieves a good balance of cycle life characteristics and high input/output power performance during pulse current charge/discharge. An oxide containing no lithium can be used in the production of the positive electrode. In this case, lithium should be incorporated by a subsequent step so as to form a lithium-containing composite oxide.

The graphitizable carbon material serving as a negative electrode material is a carbon material under graphitization process. The graphitizable carbon material partially has a regular hexagonal crystal matrix (carbon hexagonal planes). Accordingly, during charge, the graphitizable carbon material produces an intercalation compound in which lithium is intercalated.

The graphitizable carbon material is obtained by heat-treating a precursor such as coke at a temperature of about 1800 to 2200° C. in an inert gas atmosphere to partially graphitize the precursor. The precursor of the graphitizable carbon material is not specifically limited, and examples of suitable precursor are any coke made from anisotropic pitch and mesophase microspheres.

Pulverized carbon fiber is also usable as a precursor for the graphitizable carbon material. As the carbon fiber, mesophase pitch type carbon fiber or vapor phase-growth carbon fiber is preferably used.

A material made of spherical particles or aggregated particles, carbon fiber having a radial structure or the like is also preferred as a precursor for the graphitizable carbon material capable of offering high power output. Because the electrode is long and thin, the spherical particles or the aggregated particles preferably have an average particle size of about 5 µm to 15 µm, and the maximum particle size is preferably 30 µm or less.

In a carbon material having a turbostratic structure, such as coke, which is not under graphitization process, no regular hexagonal crystal matrix can be found. The carbon material having a turbostratic structure rarely produces an intercalation compound through insertion of lithium. In the case of such a carbon material, lithium is stored in the pores or adsorbed on the turbostratic structure of the carbon material.

It is effective that the identification of carbon material be done by wide-angle X-ray diffraction.

When an X-ray diffraction pattern of a carbon material is measured using CuKα radiation target, a diffraction peak is observed at around $2\theta=42°$. In the case of the carbon material having a turbostratic structure, this peak is attributed to a two-dimensional (10) diffraction peak. The peak is very broad. As the graphite layered structure develops, another broad peak appears at around $2\theta=44°$ in addition to the peak at around $2\theta=42°$. This peak is attributed to a (101) plane. The appearance of the peak attributed to a (101) plane suggests the development of a three-dimensional graphite structure. The peak at around $2\theta=42°$ is then attributed to a (100) diffraction peak. In the present invention, it is very important to control the ratio of the two different peak intensities.

In the present invention, the ratio of a peak intensity I(101) attributed to a (101) plane to a peak intensity I(100) attributed to a (100) plane is required to satisfy $0<I(101)/I(100)<1.0$ in a wide-angle X-ray diffraction pattern of the graphitizable carbon material measured with CuKα radiation.

When a peak attributed to a (101) plane cannot be observed, in other words, when $I(101)/I(100)=0$, it means there is almost no graphite structure. The use of such a carbon material leads to a decreased electroconductivity of the negative electrode during charge/discharge. The degradation becomes noticeable particularly during charge/discharge cycles including a large current pulse discharge.

Conversely, when the ratio I(101)/I(100) is 1.0 or greater, the carbon material is almost in a state of graphite rather than under graphitization process. Accordingly, charge acceptability is likely to decrease during charge/discharge cycles including a large current pulse charge.

The range of the I(101)/I(100) ratio is preferably less than 0.8, more preferably, less than 0.7. Further, the I(101)/I(100) ratio is preferably 0.5 or greater, more preferably, 0.6 or greater.

Generally speaking, a degree of graphitization is often expressed by a value of interplanar spacing d(002) between (002) planes. When the I(101)/I(100) ratio is less than 1.0, however, the d(002) value is about 0.340 nm, and therefore a change in the d(002) value is difficult to see.

In the present invention, the ratio of a peak intensity I(110) attributed to a (110) plane to a peak intensity I(004) attributed to a (004) plane is required to satisfy $0.7 \leq I(110)/I(004) \leq 1.4$ in the wide-angle X-ray diffraction pattern of the graphitizable carbon material measured with CuKα radiation.

The peak attributed to a (110) plane is observed at around $2\theta=78°$. The peak attributed to a (110) plane shows diffraction in the a-axis direction. Accordingly, a material such as graphite having a high degree of orientation in the c-axis direction tends to have a small intensity I(110).

The peak attributed to a (004) plane is observed at around $2\theta=54°$. The peak attributed to a (004) plane shows diffraction in the c-axis direction. Accordingly, a material having a high degree of orientation in the c-axis direction tends to have a large intensity I(004).

Accordingly, it can be said that a material having a small I(110)/I(004) ratio has a high degree of orientation in the c-axis direction. Because the graphitizable carbon material is a carbon material under graphitization process, the intensities of both peaks attributed to a (110) plane and a (004) plane are small. However, the peak intensity ratio I(110)/I(004) reflects the degree of orientation of a crystal.

When the I(110)/I(004) ratio is less than 0.7, the orientation of the graphitizable carbon material will be high, which reduces the speed of the absorption and desorption of lithium. As such, the input/output characteristics can hardly be improved. Conversely, when the I(110)/I(004) ratio is greater than 1.4, although the input/output characteristics will be good, a side reaction easily occurs between the electrolyte and the graphitizable carbon material. Accordingly, cycle life characteristics can hardly be improved.

The I(110)/I(004) ratio is preferably 0.8 or greater. Further, the I(110)/I(004) ratio is preferably 1.3 or less.

From the viewpoint of achieving a good balance of long cycle life and high input/output characteristics, it is preferred to control the specific surface area of the graphitizable carbon material. The specific surface area of the graphitizable carbon material can be determined by a method generally known as BET method. BET method determines the specific surface area of a graphitizable carbon material from the amount of nitrogen adsorption on the graphitizable carbon material.

The graphitizable carbon material used in the present invention preferably has a specific surface area of not less than 1 $m^2/g$ and not greater than 5 $m^2/g$, more preferably, not less than 1.5 $m^2/g$ and not greater than 3 $m^2/g$. When the graphitizable carbon material has a specific surface area of less than 1 $m^2/g$, the input/output characteristics are sometimes hardly improved. Conversely, when the specific surface area is greater than 5 $m^2/g$, the influence of the side reaction between the electrolyte and the graphitizable carbon material will be noticeable in some cases.

The average particle size (volume based median diameter: D50) of the graphitizable carbon material is not specifically limited, but preferably 5 to 15 µm.

The theoretical capacity of graphite is 372 Ah/kg. As such, in the case of using graphite as a negative electrode material, the capacity density of the negative electrode in a fully charged state can be designed to be 300 Ah/kg or greater. The graphitizable carbon material used in the present invention, however, is under graphitization process so that the graphite layered structure is not sufficiently developed. The amount of lithium that can be intercalated into the graphitizable carbon material is thus smaller than graphite. For this reason, in the present invention, the capacity density of the negative electrode in a fully charged state is preferably set to not less than 170 Ah/kg and not greater than 250 Ah/kg, more preferably, not less than 190 Ah/kg and not greater than 220 Ah/kg.

When the capacity density of the negative electrode in a fully charged state is set to greater than 250 Ah/kg, there is a possibility that charging may be performed exceeding the reversible capacity of the negative electrode. If charge/discharge cycles are repeated with such a condition, problems may arise such as deposition of metal lithium on the negative electrode surface. Conversely, when the capacity density of the negative electrode in a fully charged state is set to less than 170 Ah/kg, the battery capacity may be small and the average voltage also decreases.

The capacity density of the negative electrode is calculated by dividing a battery capacity in a fully charged state by the weight of the carbon material included in the negative electrode material mixture layer portion, the portion being positioned opposite to the positive electrode material mixture layer. The "fully charged state" used herein means a state in which a battery is charged to an upper limit voltage that is determined in advance. When a battery is charged exceeding a predetermined upper limit voltage, the battery may be in an overcharged state. The upper limit voltage for charging is usually set to a battery voltage of 4.1 to 4.4 V.

Graphitization of carbon material starts from the development of a crystallite Lc in the c-axis direction. When the Lc grows to a certain extent, a crystallite La in the a-axis direction also starts growing. As the graphitization proceeds, the La usually becomes larger than the Lc.

From the viewpoint of securing charge acceptability and capacity, the graphitizable carbon material used in the present invention preferably has a crystallite thickness Lc (004) in the c-axis direction of not less than 20 nm and less than 60 nm.

The Lc and La can be expressed as a function of the half width of a peak observed in an X-ray diffraction pattern. A method known as Gakushin method (a method defined by Japan Society for the Promotion of Science) is usually employed. In this method, a silicon powder with high purity serving as an internal reference substance is mixed with a carbon powder. An X-ray diffraction pattern of the mixture of the silicon powder with high purity and the carbon powder is then analyzed. From the values of half width of the peaks attributed to carbon and silicon observed in the obtained diffraction pattern, the thickness of the crystallite is calculated. It is preferred that Lc be determined from a peak attributed to a (004) plane and La be determined from a peak attributed to a (110) plane.

The present invention will be described below in detail using EXAMPLEs and COMPARATIVE EXAMPLEs, but it is to be understood that the present invention is not limited thereto.

EXAMPLE 1

(i) Production of Positive Electrode

As a positive electrode active material, a lithium nickel composite oxide represented by a composition formula: $LiNi_{0.55}Co_{0.3}Al_{0.15}O_2$ was used. This composite oxide was prepared by the following procedure.

To an aqueous solution of $NiSO_4$ were added a sulfate salt of Co and a sulfate salt of Al at a predetermined ratio to prepare a saturated aqueous solution. To the solution was slowly added dropwise an aqueous alkaline solution dissolving sodium hydroxide while stirring so as to neutralize the saturated aqueous solution. Thereby, a ternary hydroxide, namely, $Ni_{0.55}Co_{0.3}Al_{0.15}(OH)_2$ was precipitated by coprecipitation method. The obtained precipitate was filtrated and then washed with water, followed by drying at 80° C. The obtained hydroxide had an average particle size of about 10 µm.

Subsequently, lithium hydroxide monohydrate was added to the resulting hydroxide such that the total atomic number of Ni, Co and Al was equal to the atomic number of Li. The obtained mixture was heat-treated at 800° C. in dry air for 10 hours to give $LiNi_{0.55}Co_{0.3}Al_{0.15}O_2$. Powder X-ray diffractometry showed that the resulting lithium nickel composite oxide had a single phase layered hexagonal crystal structure. It also showed that Co and Al were incorporated in the crystals of the lithium nickel composite oxide to form a solid solution. The lithium nickel composite oxide was pulverized and sized to give a positive electrode active material.

To 100 parts by weight of the positive electrode active material were added 5 parts by weight of acetylene black serving as a conductive material, and a solution prepared by dissolving polyvinylidene fluoride (PVdF) serving as a binder in N-methyl-2-pyrrolidone (NMP), which was then mixed to give a positive electrode active material paste. The amount of PVdF used here was 5 parts by weight per 100 parts by weight of the positive electrode active material. Then, the positive electrode active material paste was applied onto both surfaces of an aluminum foil serving as a positive electrode core material, which was then dried and rolled to give a positive electrode with a thickness of 75 µm, a width of the positive electrode material mixture layer of 41 mm and a length of 2800 mm. The total thickness of the positive electrode material mixture layers formed on both surfaces of the positive electrode core material was 55 µm. The electrode area of the positive electrode was 1148 cm².

(ii) Production of Negative Electrode

To 100 parts by weight of pitch manufactured by Mitsubishi Gas Chemical Company, Inc. (product name: AR24Z, softening point: 293.9° C.) were added 5 parts by weight of paraxylene glycol serving as a cross-linking agent and 5 parts by weight of boric acid serving as a graphitization catalyst. The resulting mixture was heated to 300° C. under normal pressure. The pitch was kept melted for two hours for polymerization. The resulting polymerized pitch was heat-treated at 800° C. in an inert gas atmosphere for one hour, and then again heat-treated at 2000° C. in an argon atmosphere to give a graphitizable carbon material. The graphitizable carbon material thus obtained was pulverized and sized such that it had an average particle size of about 10 µm.

The obtained graphitizable carbon material was analyzed by powder X-ray diffractometry. A method known as Gakushin method that used a silicon powder with high purity as an internal reference substance was used to calculate d(002), Lc(004) and La(110). The analysis results are given below.

(1) The interplanar spacing d(002) between (002) planes was 0.340 nm.

(2) The crystallite thickness Lc(004) in the c-axis direction was 30 nm.

(3) The crystallite thickness La(110) in the a-axis direction was 25 nm.

A wide-angle X-ray diffraction pattern of the obtained graphitizable carbon material was measured using CuKα radiation. A peak to be attributed to a (100) plane was observed at around 2θ=42°. A peak to be attributed to a (101) plane was slightly observed at around 44°. Further, at around 2θ=78° was observed a peak to be attributed to a (110) plane. At around 2θ=54° was observed a peak to be attributed to a (004) plane.

After sufficiently removing background based on the incoherent scattering from the diffraction pattern, the I(101)/I(100) ratio and the I(110)/I(004) ratio were determined based on the heights of the predetermined peaks. Further, the specific surface area of the obtained graphitizable carbon material was determined by BET method. The results are given below.

(1) The I(101)/I(100) ratio was 0.65.
(2) The I(110)/I(004) ratio was 0.85.
(3) The specific surface area was 2.0 m$^2$/g.

To 100 parts by weight of the graphitizable carbon material was added a solution prepared by dissolving PVdF serving as a binder in NMP, followed by mixing to give a negative electrode material mixture paste. The amount of PVdF used here was 8 parts by weight per 100 parts by weight of the graphitizable carbon material. The resulting negative electrode material mixture paste was then applied onto both surfaces of a copper foil serving as a negative electrode core material, which was then dried and rolled to give a negative electrode having a thickness of 110 μm, a width of the negative electrode material mixture layer of 46 mm and a length of 2910 mm. The total thickness of the negative electrode material mixture layers formed on both surfaces of the negative electrode core material was 95 μm.

(iii) Assembly of Battery

The positive electrode and negative electrode obtained above were spirally wound with a polyethylene microporous separator having a thickness of 27 μm and a width of 50 mm interposed therebetween to form a cylindrical electrode assembly. This electrode assembly was housed in a cylindrical battery case having a diameter of 32 mm and a height of 61.5 mm with a non-aqueous electrolyte.

The non-aqueous electrolyte used here was prepared by dissolving lithium hexafluorophosphate (LiPF$_6$) serving as a solute in a solvent mixture of ethylene carbonate (EC), dimethyl carbonate (DMC) and methyl ethyl carbonate (EMC) at a volume ratio of 3:4:3 at a LiPF$_6$ concentration of 1 mol/L.

After the electrode assembly was impregnated with the non-aqueous electrolyte, the opening of the battery case was sealed to produce a battery of EXAMPLE 1. In this example, the densities of the positive electrode material mixture layer and the negative electrode material mixture layer were adjusted such that the capacity density of the negative electrode in a fully charged state (i.e., a battery voltage of 4.2 V) was 200 Ah/kg.

COMPARATIVE EXAMPLE 1

A negative electrode was produced in the same manner as in EXAMPLE 1 except that a non-graphitizable carbon material (Carbotron P manufactured by Kureha Chemical Industry Co., Ltd.) was used instead of the graphitizable carbon material. With the use of the negative electrode, a battery of COMPARATIVE EXAMPLE 1 was produced in the same manner as in Example 1.

The non-graphitizable carbon material (Carbotron P) was analyzed by powder X-ray diffractometry to find that the interplanar spacing d(002) between (002) planes was 0.370 nm. Because the non-graphitizable carbon material had a turbostratic structure, it was impossible to measure Lc(004) and La(110).

A wide-angle X-ray-diffraction pattern of the non-graphitizable carbon material was measured using CuKα radiation. Only a broad diffraction peak ranging from around 2θ=42° to around 44° was observed, indicating that the non-graphitizable carbon material had a completely turbostratic structure. A peak to be attributed to a (110) plane was not observed, either.

The non-graphitizable carbon material (Carbotron P) had an average particle size of about 10 μm and a specific surface area determined by BET method of 6.4 m$^2$/g.

COMPARATIVE EXAMPLE 2

A negative electrode was produced in the same manner as in EXAMPLE 1 except that flake natural graphite (manufactured by The Kansai Coke and Chemical Co., Ltd.) was used instead of the graphitizable carbon material. With the use of the negative electrode, a battery of COMPARATIVE EXAMPLE 2 was produced in the same manner as in Example 1.

The flake natural graphite was analyzed by powder X-ray diffractometry in the same manner as in EXAMPLE 1. The results are given below.

(1) The interplanar spacing d(002) between (002) planes was 0.335 nm.
(2) The crystallite thickness Lc(004) in the c-axis direction was 150 nm.
(3) The crystallite thickness La(110) in the a-axis direction was 150 nm.

A wide-angle X-ray diffraction pattern of the flake natural graphite was measured using CuKα radiation. After removing background based on the incoherent scattering from the diffraction pattern, the I(101)/I(100) ratio and the I(110)/I(004) ratio were determined based on the heights of the predetermined peaks. The specific surface area was also determined by BET method. The results are given below.

(1) The I(101)/I(100) ratio was as large as 2.25, indicating that the carbon hexagonal plane of the graphite had developed three-dimensionally.
(2) The I(110)/I(004) ratio was 0.64.
(3) The specific surface area was 7.0 m$^2$/g.

[Evaluation]

The batteries of EXAMPLE 1 and COMPARATIVE EXAMPLEs 1 and 2 were subjected to three charge/discharge cycles, each of which was performed in an environment of 25° C. with a constant current of 400 mA, an upper limit voltage for charging of 4.2 V and a lower limit voltage for discharging of 2.5 V. All the batteries had a capacity of 1.8 Ah to 2.0 Ah. In order to measure the direct current internal resistance (DC-IR) of the batteries, a current-voltage characteristic test was performed according to the following procedure.

Each battery was charged at a constant current in an environment of 25° C. until the battery had a state of charge (SOC) of 50%.

Figure 1:
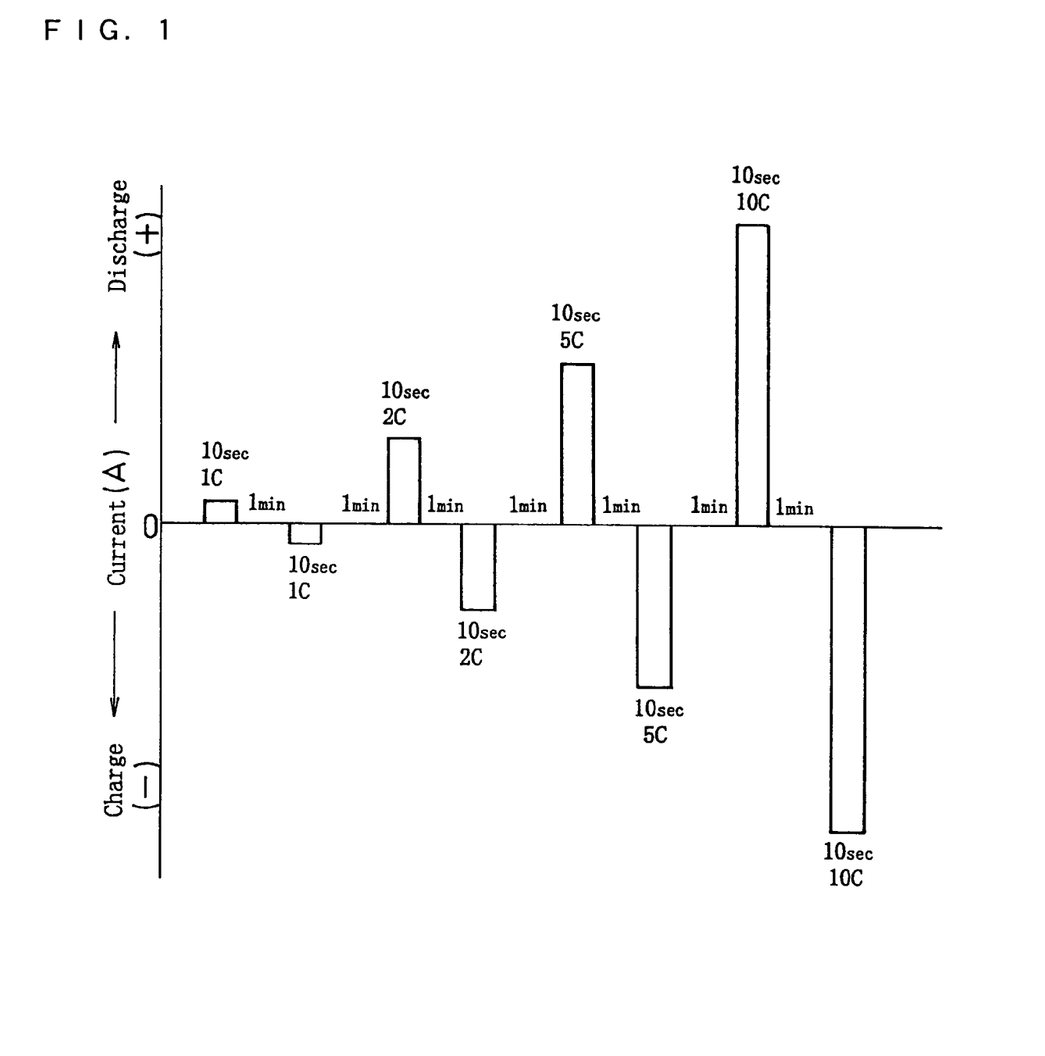
FIG. 1 is a bar graph showing a pulse pattern repeated in a current-voltage characteristic test.

Subsequently, pulse discharges and pulse charges were repeated as shown in FIG. 1. The voltage was measured 10 seconds after the application of each pulse discharge. The obtained voltage values were plotted against current values.

Figure 2:
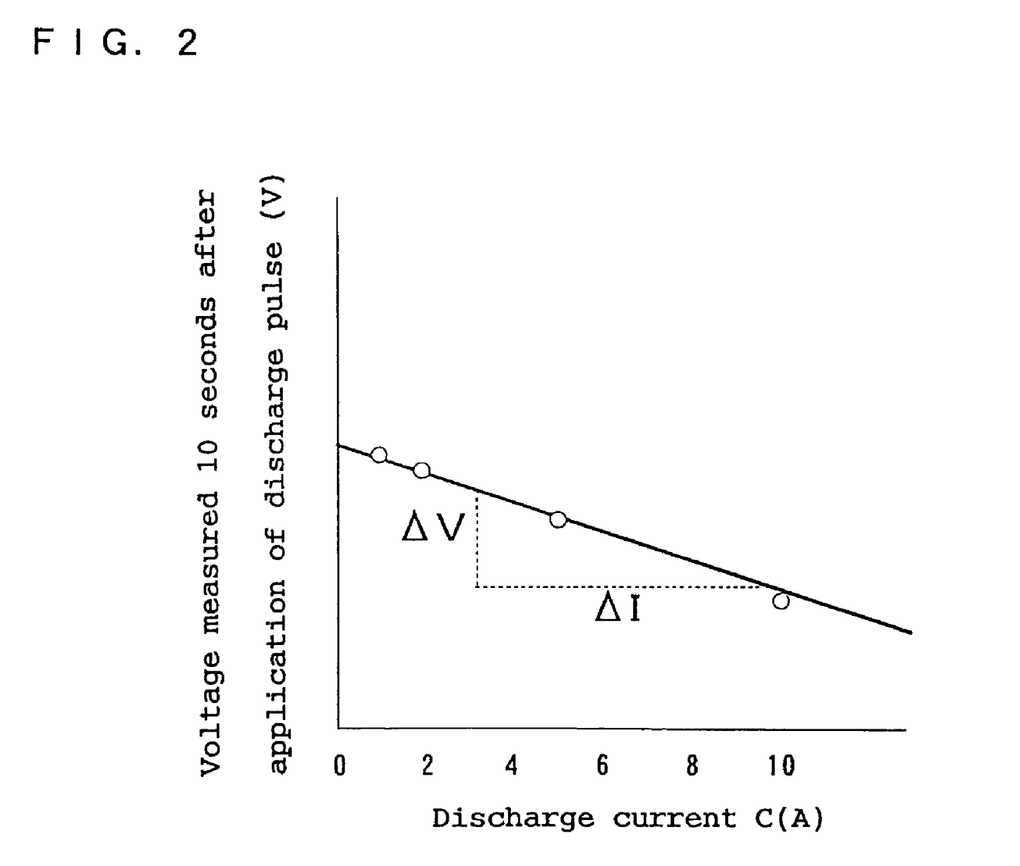
FIG. 2 is a graph used to calculate a direct-current internal resistance of a battery.

Least-square method was applied to the plots to determine an approximate line as shown in FIG. 2. The gradient value of the approximate line was taken as the direct current internal resistance (DC-IR). The results are given below.

The DC-IR of the battery of EXAMPLE 1 (25° C.) was 10.8 mΩ.

The DC-IR of the battery of COMPARATIVE EXAMPLE 1 (25° C.) was 11.2 mΩ.

The DC-IR of the battery of COMPARATIVE EXAMPLE 2 (25° C.) was 12.3 mΩ.

Further, the DC-IR of each battery was again measured in the same manner as above in an environment of 0° C.

The DC-IR of the battery of EXAMPLE 1 (0° C.) was 19.5 mΩ.

The DC-IR of the battery of COMPARATIVE EXAMPLE 1 (0° C.) was 20.5 mΩ.

The DC-IR of the battery of COMPARATIVE EXAMPLE 2 (0° C.) was 26.0 mΩ.

The batteries having been subjected to the DC-IR measurement were put through the following two different types of pulse cycle life characteristic test.

(1) Cycle Life Characteristic Test with High-load Pulse Charge

Figure 3:
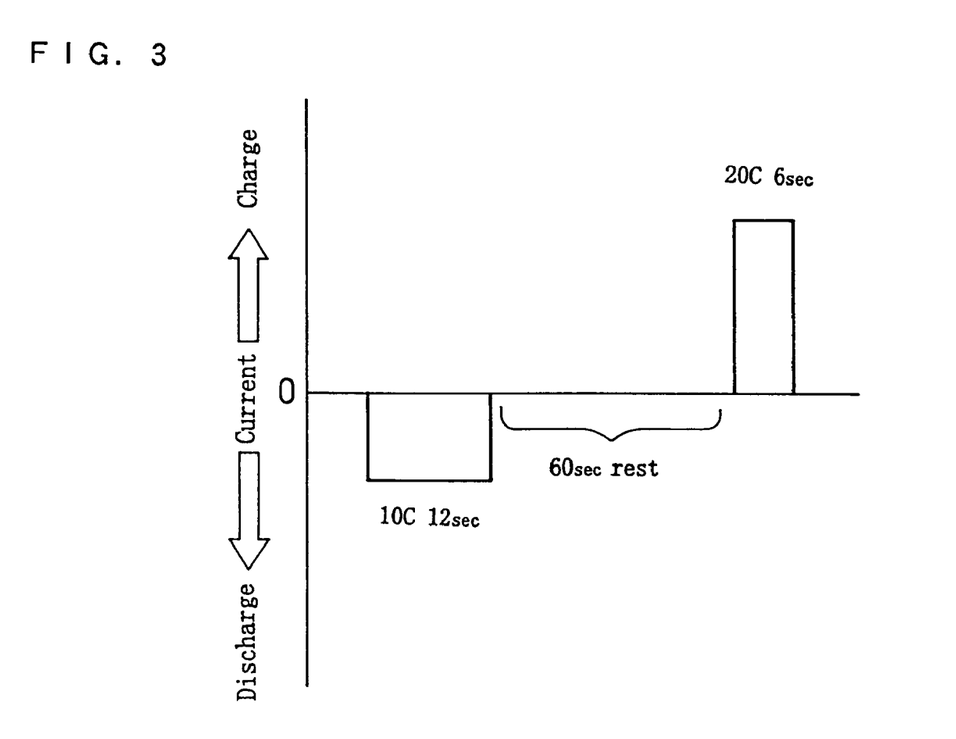
FIG. 3 is a bar graph showing a pulse pattern in a cycle life characteristic test with a high-load pulse charge.

The pattern shown in FIG. 3, which involved a pulse discharge at 10 C for 12 seconds and a pulse charge at 20 C for 6 seconds with an interval of 60 seconds therebetween, was regarded as one cycle. By repeating this cycle in an environment of 40° C., the SOC of the battery was controlled to vary theoretically within a range of 47 to 50%.

(2) Cycle Life Characteristic Test with High-load Pulse Discharge

Figure 4:
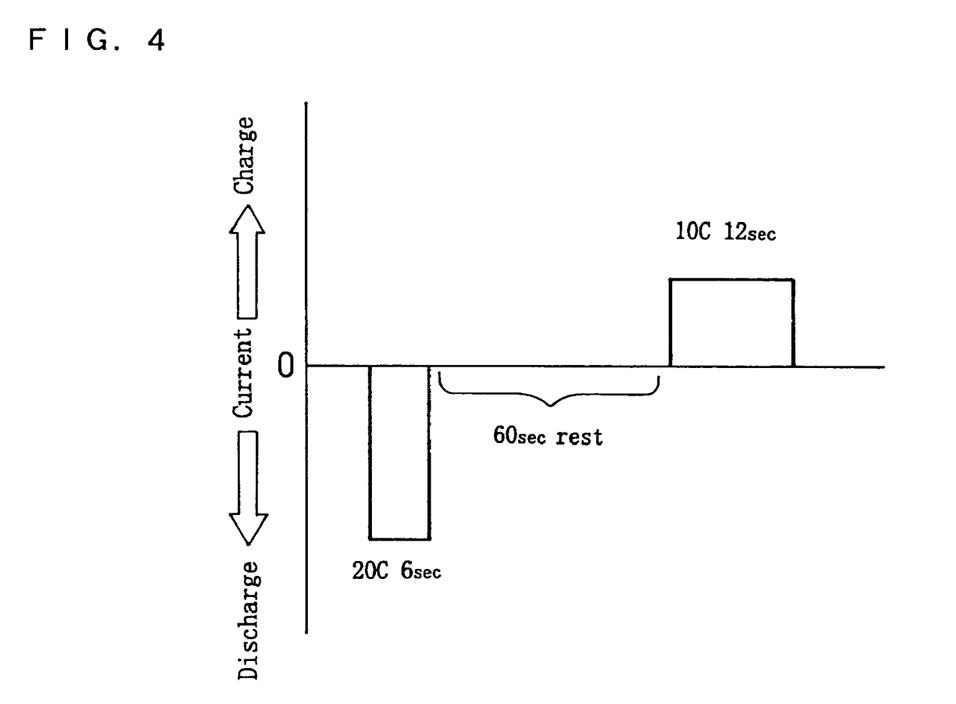
FIG. 4 is a bar graph showing a pulse pattern in a cycle life characteristic test with a high-load pulse discharge.

The pattern shown in FIG. 4, which involved a pulse discharge at 20 C for 6 seconds and a pulse charge at 10 C for 12 seconds with an interval of 60 seconds therebetween, was regarded as one cycle. By repeating this cycle in an environment of 40° C., the SOC of the battery was controlled to vary theoretically within a range of 47 to 50%.

The batteries of EXAMPLE 1 and COMPARATIVE EXAMPLEs 1 and 2, one of each, were subjected to the two types of pulse cycle life characteristic test. Each battery was brought back to an environment of 25° C. every after 15000 cycles to measure discharge capacity and DC-IR.

As for the measurement of discharge capacity, each battery was subjected to three charge/discharge cycles, in each of which the battery was charged at a constant current of 400 mA to an upper limit voltage of 4.2 V and discharged to a lower limit voltage of 2.5 V. The discharge capacity at the third cycle was measured.

Figure 5:
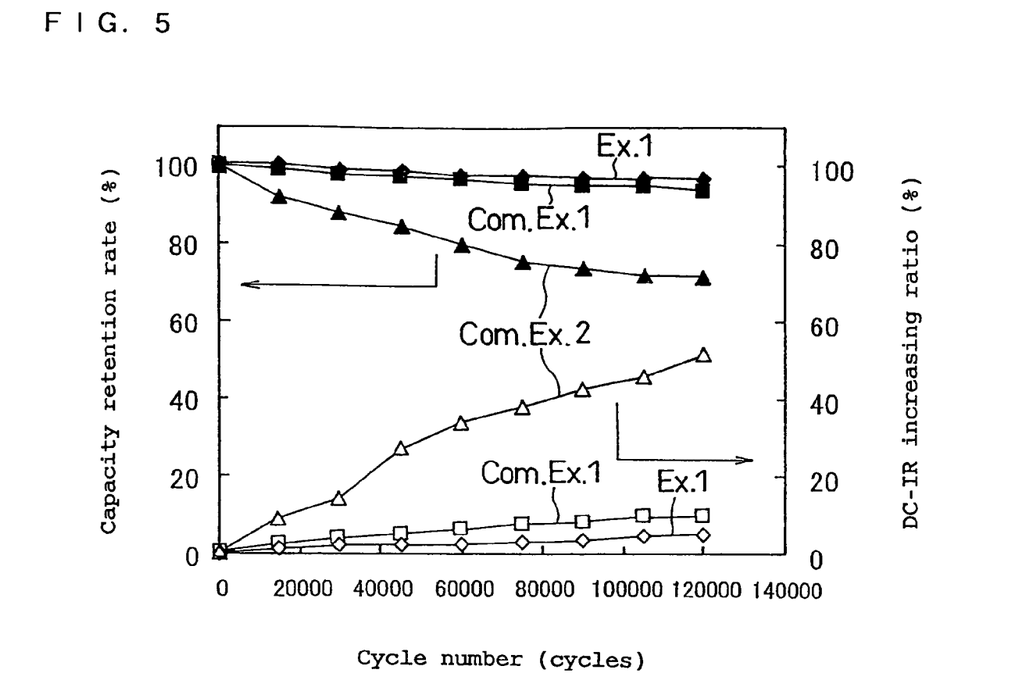
FIG. 5 is a graph showing cycle life characteristics with a high-load pulse charge for batteries of EXAMPLE 1, COMPARATIVE EXAMPLEs 1 and 2.
Figure 6:
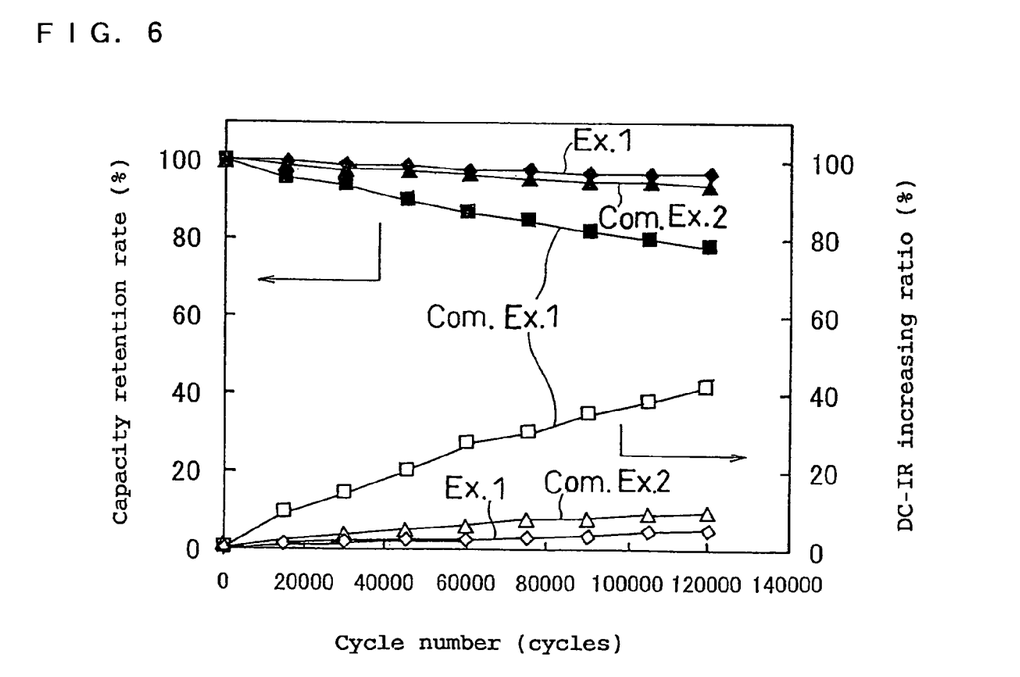
FIG. 6 is a graph showing cycle life characteristics with a high-load pulse discharge for batteries of EXAMPLE 1, COMPARATIVE EXAMPLEs 1 and 2.

FIGS. 5 and 6 show capacity retention rate (the ratio of the measured capacity to the initial capacity) vs. the number of cycles as well as DC-IR increasing ratio (the increased percentage of DC-IR from the initial value) vs. the number of cycles.

FIG. 5 shows the cycle life characteristics with a high-load pulse charge.

The battery of EXAMPLE 1 (shown as Ex. 1 in the graph) exhibited little degradation in capacity even after 120000 cycles. The DC-IR increasing ratio of the battery of EXAMPLE 1 was about 5%, indicating that high power output was retained. Similarly, the battery of COMPARATIVE EXAMPLE 1 (shown as Com. Ex. 1 in the graph) had a high capacity retention rate and a relatively small DC-IR increasing ratio of about 10%. The battery of COMPARATIVE EXAMPLE 2 (shown as Com. Ex. 2 in the graph), however, exhibited a significant degradation in capacity as the cycles proceeded, and had a large DC-IR increasing ratio, indicating that the power output decreased significantly. Presumably, this is because the use of the carbon material with high graphitization degree in the negative electrode resulted in insufficient charge acceptability during the high-load pulses charge.

FIG. 6 shows the cycle life characteristics with a high-load pulse discharge.

Similar to the cycle life characteristics with a high-load pulse charge, the battery of EXAMPLE 1 exhibited favorable cycle characteristics. The battery of COMPARATIVE EXAMPLE 1, however, showed a significant degradation in capacity, which was different from the result of cycle life characteristics with a high-load pulse charge. In particular, the DC-IR increased significantly, in other words, the power output decreased significantly. Presumably, this is because the negative electrode had low electroconductivity due to the use of the non-graphitizable carbon material in the negative electrode, failing to sufficiently respond to the high-load pulse discharges. In contrast, the battery of COMPARATIVE EXAMPLE 2 exhibited favorable responses to the high-load pulse discharges and relatively excellent cycle characteristics because the battery used the carbon material with a high graphitization degree so that the negative electrode had high electroconductivity.

The above results illustrate that the battery of EXAMPLE 1 using the graphitizable carbon material with a I(101)/I(100) ratio of 0.65 has adaptability to both high-load pulse charges and high-load pulse discharges. It can accordingly be concluded that, when used in an hybrid electric vehicle (HEV), the battery of the present invention can always offer excellent cycle life regardless of driving mode.

In the case of the battery of COMPARATIVE EXAMPLE 1 containing the non-graphitizable carbon material and the battery of COMPARATIVE EXAMPLE 2 containing the carbon material having a large I(101)/I(100) ratio of 2.25 and a high graphitization degree, they showed a significant degradation depending on the pulse load pattern. Such batteries cannot offer sufficient characteristics when used in HEVs.

Further, the results of the DC-IR measurement in an environment of 0° C. show that the battery of EXAMPLE 1 was superior also in terms of power output at low temperature. This suggests that the output characteristics at low temperature were largely affected by the orientation of carbon material rather than the graphitization degree of carbon material.

In a carbon material having a high degree of orientation, in other words, a carbon material having a small I(110)/I(004) ratio of 0.64, the speed of absorption/desorption of lithium ions (diffusion speed of lithium ions) is small particularly at a low temperature. For this reason, the battery of COMPARATIVE EXAMPLE 2 containing such carbon material in the negative electrode exhibited a significant decrease in power output particularly at a low temperature.

In contrast, the battery of EXAMPLE 1 containing the carbon material having a large I(110)/I(004) ratio of 0.85 and a low degree of orientation, exhibited favorable low temperature output characteristics. Additionally, because in a carbon material having a turbostratic structure, crystals are not regularly oriented, the battery of COMPARATIVE EXAMPLE 1 containing such carbon material also exhibited favorable low temperature output characteristics.

EXAMPLE 2

As a positive electrode active material, a lithium nickel composite oxide represented by a composition formula: $LiNi_{0.4}Co_{0.3}Mn_{0.3}O_2$ was used. The composite oxide was prepared by the following procedure.

To an aqueous solution of $NiSO_4$ were added a sulfate salt of Co and a sulfate salt of Mn at a predetermined ratio to prepare a saturated aqueous solution. To the solution was slowly added dropwise an aqueous alkaline solution dissolving sodium hydroxide while stirring so as to neutralize the saturated aqueous solution. Thereby, a ternary hydroxide, namely, $Ni_{0.4}Co_{0.3}Mn_{0.3}(OH)_2$ was produced by coprecipitation method. The obtained precipitate was filtrated and then washed with water, followed by drying at 80° C.

Subsequently, lithium hydroxide monohydrate was added to the resulting hydroxide such that the total atomic number of Ni, Co and Mn was equal to the atomic number of Li. The obtained mixture was heat-treated at 850° C. in dry air for 10 hours to give $LiNi_{0.4}Co_{0.3}Mn0.3O_2$. Powder X-ray diffractometry showed that the resulting lithium nickel composite oxide had a single phase layered hexagonal crystal structure. It also showed that Co and Mn were incorporated in the crystals of the lithium nickel composite oxide to form a solid solution. The lithium nickel composite oxide was pulverized and sized to give a positive electrode active material. A positive electrode was produced in the same manner as in EXAMPLE 1 except that the above-obtained positive electrode active material was used.

As the carbon material for negative electrode, 12 different carbon materials having different X-ray diffraction characteristics (i.e. I(101)/I(100) ratio and I(110)/I(004) ratio) shown in Table 1 were prepared.

The carbon materials were prepared in the same manner as the carbon material used in EXAMPLE 1 was prepared except that the amounts of paraxylene glycol (cross-linking agent) and boric acid (graphitization catalyst) relative to 100 parts by weight of pitch manufactured by Mitsubishi Gas Chemical Company, Inc. (product name: AR24Z, softening point: 293.9° C.) were changed to those shown in Table 1, and that the temperature for heat-treatment for graphitization was changed to those shown in Table 1.

Negative electrodes were produced in the same manner as in EXAMPLE 1 except that the 12 different carbon materials were used.

Batteries A to L were produced in the same manner as in EXAMPLE 1 except that the positive electrode and negative electrode thus obtained were used. Similar to EXAMPLE 1, the densities of the positive electrode material mixture layer and the negative electrode material mixture layer were adjusted such that the capacity density of the negative electrode in a fully charged state (i.e., a battery voltage of 4.2 V) was 200 Ah/kg.

[Evaluation]

The batteries A to L were subjected to the same DC-IR measurement in an environment of 0° C. as described in EXAMPLE 1. The results are shown in Table 2. The batteries were further subjected to the same cycle life characteristic test with a high-load pulse charge and cycle life characteristic test with a high-load pulse discharge in an environment of 40° C. as described in EXAMPLE 1. The DC-IR increasing ratio of each battery after 120000 cycles is shown in Table 2.

TABLE 2

| Battery | DC-IR (0° C., mΩ) | DC-IR increasing ratio (25° C., %) | |
|---|---|---|---|
| | | High-load charge pulse cycle | High-load discharge pulse cycle |
| Battery A | 20.5 | 12.5 | 22.1 |
| Battery B | 20.2 | 9.9 | 15.0 |
| Battery C | 19.9 | 8.6 | 8.5 |
| Battery D | 20.1 | 7.9 | 7.2 |
| Battery E | 20.0 | 7.8 | 6.5 |
| Battery F | 19.8 | 9.0 | 8.1 |
| Battery G | 19.6 | 11.0 | 10.8 |
| Battery H | 20.1 | 15.7 | 11.8 |
| Battery I | 20.4 | 18.7 | 12.2 |
| Battery J | 21.8 | 30.4 | 13.9 |
| Battery K | 24.8 | 33.3 | 13.2 |
| Battery L | 25.7 | 35.7 | 13.6 |

Table 2 shows that the batteries A to J were relatively favorable in terms of output characteristics at low temperature. This result is highly correlated with the orientation of carbon material used in the negative electrode. It is evident from Table 2 that the I(110)/I(004) ratio, which indicates the degree of orientation, is preferably 0.70 or greater.

The batteries B to I were superior in terms of both cycle life characteristics with a high-load pulse charge and cycle life characteristics with a high-load pulse discharge. Among them, particularly excellent were the batteries C to G. This result is highly correlated with the graphitization degree of

TABLE 1

| Battery | Amount of paraxylene glycol (parts by weight) | Amount of boric acid (parts by weight) | Temperature for heat treatment (° C.) | I(101)/I(100) ratio | I(110)/I(004) ratio | Specific surface area of negative electrode carbon material (m²/g) |
|---|---|---|---|---|---|---|
| Battery A | 5 | 3 | 1300 | 0 | 1.50 | 4.2 |
| Battery B | 5 | 5 | 1800 | 0.5 | 1.45 | 3.0 |
| Battery C | 5 | 8 | 1800 | 0.6 | 1.40 | 2.8 |
| Battery D | 5 | 10 | 1800 | 0.62 | 1.28 | 2.7 |
| Battery E | 3 | 5 | 2000 | 0.64 | 1.02 | 2.2 |
| Battery F | 5 | 5 | 2000 | 0.70 | 1.08 | 2.0 |
| Battery G | 8 | 5 | 2000 | 0.80 | 0.85 | 1.9 |
| Battery H | 10 | 5 | 2000 | 0.85 | 0.77 | 2.1 |
| Battery I | 5 | 3 | 2200 | 0.96 | 0.80 | 2.3 |
| Battery J | 5 | 5 | 2200 | 1.00 | 0.70 | 2.3 |
| Battery K | 5 | 8 | 2200 | 1.20 | 0.65 | 2.8 |
| Battery L | 5 | 10 | 2400 | 1.43 | 0.60 | 3.5 | carbon material used in the negative electrode. It is apparent from Table 2 that a particularly preferred I(101)/I(100) ratio is 0.60 to 0.80. As for the batteries J, K and L having a I(101)/I(100) ratio of 1.0 or greater, the DC-IR increasing ratio was large in the cycle life characteristic test with a high-load pulse charge, indicating that those batteries cannot offer long life. Further, when the I(110)/I(004) ratio was greater than 1.4, the DC-IR increasing ratio was large in the cycle life characteristic test with a high-load pulse discharge.

The foregoing indicates that a carbon material for negative electrode that is superior in terms of cycle life characteristic with a high-load pulse current as well as in low temperature output characteristics has a I(110)/I(004) ratio of not less than 0.7 and not greater than 1.4, and a I(101)/I(100) ratio of less than 1.0. It also indicates that the I(101)/I(100) ratio is preferably 0.6 to 0.8, more preferably 0.6 to 0.7.

EXAMPLE 3

As the carbon material for negative electrode, 6 different carbon materials having different specific surface areas shown in Table 3 were prepared. These carbon materials were prepared in the same manner as the carbon material used in EXAMPLE 1 was prepared except that boron oxide was used as the graphitization catalyst instead of boric acid, and that the amount of boron oxide was changed in a range of 3 to 10 parts by weight relative to 100 parts by weight of pitch manufactured by Mitsubishi Gas Chemical Company, Inc. (product name: AR24Z, softening point: 293.9° C.). Negative electrodes were produced in the same manner as in EXAMPLE 1 except that the above 6 different graphitizable carbon materials were used.

Batteries M to R were produced in the same manner as in EXAMPLE 1 except that the above-produced negative electrodes were used. Similar to EXAMPLE 1, the densities of the positive electrode material mixture layer and the negative electrode material mixture layer were adjusted such that the capacity density of the negative electrode in a fully charged state (i.e., when the battery voltage was 4.2 V) was 200 Ah/kg.

[Evaluation]

The batteries M to R were subjected to three charge/discharge cycles, each of which was performed in an environment of 25° C. with a constant current of 400 mA, an upper limit voltage for charging of 4.2 V and a lower limit voltage for discharging of 2.5 V. The discharge capacity at the third cycle was measured and taken as initial capacity.

The batteries M to R were further subjected to the same DC-IR measurement in an environment of 25° C. as described in EXAMPLE 1.

Subsequently, the batteries were charged until they had a state of charge (SOC) of 80%, and then allowed to sit in an environment of 60° C. for 28 days. Thereafter, the battery was brought back to an environment of 25° C., and the above-described charge/discharge cycle was repeated three times. The discharge capacity at the third cycle was measured and taken as recovered capacity.

Using the initial capacity and the recovered capacity, a capacity recovery rate was calculated by the following equation:

Capacity recovery rate (%)={(Recovered capacity)/(Initial capacity)}×100

The results are shown in Table 3.

As can be seen from Table 3, the capacity recovery rate of the batteries M to Q containing the graphitizable carbon material having a specific surface area of 0.8 to 5.0 $m^2/g$ did not degrade almost at all. In contrast, the battery R having a specific surface area of 6.0 $m^2/g$ suffered a significant capacity degradation. Presumably, this is attributed to the fact that a side reaction easily occurs between the negative electrode surface and the electrolyte. The battery M containing the graphitizable carbon material having a small specific surface area of 0.8 $m^2/g$ exhibited a favorable capacity recovery rate, but the initial DC-IR value was large, indicating that it is not suitable for achieving high power output. From the above results, it is clear that a preferred specific surface area of the graphitizable carbon material is 1 to 5 $m^2/g$, more preferably, 1.5 to 3 $m^2/g$.

EXAMPLE 4

Batteries S to X were produced in the same manner as in EXAMPLE 1 except that the capacity density of the negative electrode in a fully charged state was changed to those shown in Table 4 by changing the density and thickness of the negative electrode material mixture layer while maintaining the density and thickness of the positive electrode material mixture layer constant.

[Evaluation]

Each battery was subjected to the same cycle life characteristic test with a high-load pulse charge in an environment of 40° C. as described in EXAMPLE 1. The capacity retention rate and DC-IR increasing ratio after 120000 cycles were determined.

The capacity retention rate was determined as follows.

Each battery was first subjected to three charge/discharge cycles, each of which was performed in an environment of 25° C. with a constant current of 400 mA, an upper limit voltage for charging of 4.2 V and a lower limit voltage for discharging of 2.5 V. The discharge capacity at the third cycle was measured and taken as initial capacity.

The battery was further subjected to the same pulse charge/discharge cycles with a high load pulse charge as in Example 1. After 120000 cycles, the discharge capacity was again measured in an environment of 25° C. under the same conditions as above: a constant current of 400 mA, an upper limit voltage for charging of 4.2 V and a lower limit voltage for discharging of 2.5 V.

TABLE 3

| Battery | Specific surface area of negative electrode carbon material ($m^2/g$) | I(101)/I(100) ratio | I(110)/I(004) ratio | Capacity recovery rate (%) | DC-IR (25° C., mΩ) |
| --- | --- | --- | --- | --- | --- |
| Battery M | 0.8 | 0.60 | 0.91 | 99 | 15.4 |
| Battery N | 1.0 | 0.69 | 0.95 | 99 | 12.5 |
| Battery O | 1.5 | 0.66 | 0.80 | 99 | 11.0 |
| Battery P | 3.0 | 0.72 | 0.86 | 99 | 11.2 |
| Battery Q | 5.0 | 0.70 | 0.95 | 96 | 11.8 |
| Battery R | 6.0 | 0.75 | 1.15 | 85 | 11.2 |

Subsequently, the rate of the discharge capacity after 120000 cycles to the initial capacity was calculated in percentage.

TABLE 4

| Battery | Capacity density of negative electrode in a fully charged state (Ah/kg) | Capacity retention rate (%) | DC-IR increasing ratio (%) |
|---|---|---|---|
| Battery S | 150 | 81 | 18.4 |
| Battery T | 170 | 95 | 7.9 |
| Battery U | 200 | 96 | 6.7 |
| Battery V | 230 | 95 | 7.1 |
| Battery W | 250 | 90 | 9.5 |
| Battery X | 270 | 78 | 25.0 |

Table 4 shows that the batteries T to W exhibited relatively favorable pulse cycle life characteristics, indicating that it is desirable to design the battery such that the capacity density of the negative electrode in a fully charged state is 170 to 250 Ah/kg.

The battery X having a negative electrode capacity density of 270 Ah/kg exhibited large capacity degradation as well as a large DC-IR increasing ratio. This is attributed to insufficient charge acceptability during the high-load charge caused by the battery design, that is, the capacity density of the negative electrode was out of the range in which the negative electrode could charge/discharge reversibly.

As for the battery S having a negative electrode capacity density of 150 Ah/kg, in other words, the battery designed to be applied with a very low load, few lithium ions were intercalated between graphite layers during charge, and accordingly the charge/discharge reaction proceeded in a site where an irreversible reaction took place. Presumably, this caused degradation at the negative electrode, causing the capacity degradation and increasing the DC-IR increasing ratio.

As discussed above, as the results of EXAMPLEs and COMPARATIVE EXAMPLEs show, in order to provide a non-aqueous electrolyte secondary battery that can offer long life and a high power output, it is important to control the graphitization degree and orientation of the graphitizable carbon material. Moreover, in order to provide a non-aqueous electrolyte secondary battery that can offer long life and a high power output, it is effective to restrict BET specific surface area and battery design (i.e., capacity density of negative electrode in a fully charged state).

Although EXAMPLEs and COMPARATIVE EXAMPLEs given above used a lithium nickel composite oxide as a positive electrode active material, a similar result can be obtained even when a lithium-containing composite oxide such as lithium manganese composite oxide or lithium cobalt composite oxide is used.

Although EXAMPLEs and COMPARATIVE EXAMPLEs given above used a solvent mixture of EC, DMC and EMC as a non-aqueous solvent of the non-aqueous electrolyte, a similar result can be obtained even when other conventionally known non-aqueous solvent such as diethyl carbonate (DEC), butylene carbonate (BC) or methyl propionate is used as long as it has an oxidation/reduction resistant potential of 4 V level. A similar result can be obtained even when a conventionally known solute such as $LiBF_4$ or $LiClO_4$ is used as a solute to be dissolved in the non-aqueous solvent.

EXAMPLEs and COMPARATIVE EXAMPLEs presented above were described using cylindrical batteries, but the battery shape is not limited thereto. The effect of the present invention can be attained also when the battery is a prismatic battery containing an electrode assembly prepared by spirally winding long electrodes, or a prismatic battery containing an electrode assembly composed of a laminate of thin electrodes.

As described above, the present invention can provide a non-aqueous electrolyte secondary battery having long cycle life and excellent long-term durability that can offer high power input/output performance even in a low temperature environment. The non-aqueous electrolyte secondary battery of the present invention is suitably applicable as a secondary battery mounted in, particularly, hybrid electric vehicles and fuel cell vehicles. In other words, it is suitably used as a secondary battery that assists a driving motor. The non-aqueous electrolyte secondary battery of the present invention is also suitable as a power source for operating a device that requires a high power output such as power tools.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A high power output non-aqueous electrolyte secondary battery comprising: a positive electrode including a lithium-containing composite oxide; a negative electrode including a carbon material capable of absorbing and desorbing lithium ions; and a non-aqueous electrolyte, wherein said carbon material comprises a graphitizable carbon material, and said graphitizable carbon material has an average particle size of 5 µm to 15 µm, and wherein in a diffraction pattern of said graphitizable carbon material measured by wide-angle powder X-ray diffractometry, a ratio: I(101)/I(100) of a peak intensity I(101) attributed to a (101) plane to a peak intensity I(100) attributed to a (100) plane satisfies 0<I(101)/I(100)<1.0, and a ratio: I(110)/I(004) of a peak intensity I(110) attributed to a (110) plane to a peak intensity I(004) attributed to a (004) plane satisfies $0.7 \leq I(110)/I(004) \leq 1.4$.

2. The high power output non-aqueous electrolyte secondary battery in accordance with claim 1, wherein said negative electrode in a fully charged state has a capacity density of not less than 170 Ah/kg and not greater than 250 Ah/kg.

3. The high power output non-aqueous electrolyte secondary battery in accordance with claim 1, wherein said graphitizable carbon material has a specific surface area measured by BET method of not less than 1 $m^2/g$ and not greater than 5 $m^2/g$.

* * * * *